United States Patent [19]

Gerace et al.

[11] Patent Number: 5,223,106

[45] Date of Patent: Jun. 29, 1993

[54] METHOD OF USING AN ELECTROPHORETIC COATABLE SEALANT COMPOSITION IN ASSEMBLING AUTOMOBILE BODIES

[75] Inventors: Janet M. Gerace; Michael J. Gerace, both of Dayton, Ohio

[73] Assignee: Aster, Inc., Yellow Springs, Ohio

[21] Appl. No.: 872,056

[22] Filed: Apr. 23, 1992

Related U.S. Application Data

[62] Division of Ser. No. 612,541, Nov. 13, 1990, Pat. No. 5,143,650.

[51] Int. Cl.$^5$ .............................................. C25D 13/00
[52] U.S. Cl. .................... 204/181.1; 205/188; 252/506; 252/508; 252/511
[58] Field of Search ............... 204/181.1; 252/506, 252/508, 511; 205/188

[56] References Cited

U.S. PATENT DOCUMENTS

| | | | |
|---|---|---|---|
| 3,963,647 | 6/1976 | Straub | 252/511 |
| 4,455,398 | 6/1984 | Budich et al. | 524/494 |
| 4,477,636 | 10/1984 | Muroi et al. | 525/444 |
| 4,629,659 | 12/1986 | Kyono et al. | 428/659 |
| 4,661,542 | 4/1987 | Gilch et al. | 524/59 |
| 4,682,711 | 7/1987 | Reighard et al. | 222/75 |
| 4,695,508 | 9/1987 | Kageyama et al. | 252/511 |
| 4,775,719 | 10/1988 | Markevka et al. | 525/125 |
| 4,882,090 | 11/1989 | Batzill et al. | 252/511 |
| 4,900,771 | 2/1990 | Gerace et al. | 524/296 |
| 4,904,360 | 2/1990 | Wilson, Jr. et al. | 204/181.7 |
| 4,908,273 | 3/1990 | Urech et al. | 525/438 |
| 4,962,139 | 10/1990 | Lo | 252/511 |
| 4,963,614 | 10/1990 | Ito et al. | 524/495 |

FOREIGN PATENT DOCUMENTS

| | | |
|---|---|---|
| 149483 | 11/1981 | Japan. |
| 81366 | 5/1984 | Japan. |
| 63-140609 | 6/1988 | Japan. |
| 2-151646 | 6/1990 | Japan. |

OTHER PUBLICATIONS

"Conductive Fillers", Handbook of Fillers for Plastics, (Chap. 13), Van Nostrand Reinhold Co., NY (1987).
"Electrocoat Theory", Inmont Electrocoat Manual (internal publication #TCC-500-487).
"New Developments in Highly Efficient Electroconductive Carbon Blacks", Akzo Chemie reprint from SPE 45th Annual Technical Conference & Exhibit (1987).
Bolger, "Conductive Adhesives", Handbook of Adhesives, pp. 705–712.
"Carbon Black", Handbook of Fillers for Plastics, (Chap. 19), Van Nostrand Reinhold Co., NY (1987).
"Conductive Carbon Black in Plastics", Cabot Corporation Technical Report S-39.

Primary Examiner—John Niebling
Assistant Examiner—Kishor Mayekar
Attorney, Agent, or Firm—Killworth, Gottman, Hagan & Schaeff

[57] ABSTRACT

An electrophoretic coatable sealant composition for use in assembling automobile bodies comprising an adhesive material selected from the group consisting of epoxys, urethanes, epoxyurethane hybrids, acrylics, epoxyacrylic hybrids, polyvinylchlorides and mixtures thereof and a conductive filler in an amount such that the sealant composition will accept electrophoretic deposition of a primer composition yet preserve the adhesive properties of the sealant composition. The conductive filler is selected from the group consisting of non-treated furnace-type conductive carbon blacks.

14 Claims, No Drawings

METHOD OF USING AN ELECTROPHORETIC COATABLE SEALANT COMPOSITION IN ASSEMBLING AUTOMOBILE BODIES

This is a division of application Ser. No. 612,541, now U.S. Pat. No. 5,143,650 filed Nov. 13, 1990.

BACKGROUND OF THE INVENTION

This invention relates to sealant compositions. More particularly the invention relates to electrophoretic coatable sealant compositions which are capable of being hot applied to metal surfaces for adhesive and sealant purposes and have the added capability of accepting electrophoretic coatings.

Adhesive and sealant compositions are widely used in many commercial and industrial production processes. A multitude of such compositions have been developed over the years, many of which were designed for a special use. Adhesive compositions generally are used to bind two substrates together Sealant compositions generally are used to form a load-bearing elastic joint between two substrates. The sealants also exclude dirt, moisture and other materials from the joint and form a smooth juncture at the joint and in some applications must be paintable. Necessarily, there is some overlap in the functions of the adhesive and sealant compositions.

The automotive industry is a major user of both adhesive and sealant compositions. Automobiles are assembled from several structural components. The components are joined together in various fashions depending on the particular components and the degree of stress that will have to be endured. For certain assembly steps an adhesive composition applied as a liquid and subsequently hardened provides sufficient bonding strength. For example, metal assemblies of door panels, quarter panels, tailgates, and roofs use adhesive compositions. These same assemblies also use sealant compositions at a later stage in the assembly line. Still other automobile assemblies which are welded or bolted together use sealant compositions in their seams. The wheel house, shock tower, rocker panel, firewall, floor hem flange, floorplan, and trunk are a few examples of where sealants, but not adhesives, are used.

Typical automobile body assembly lines contain a separate body shop and paint shop areas where adhesives and sealants are individually used in each area respectively. Adhesive compositions applied in the body shop area are normally high strength epoxy or modified-epoxy adhesives which are capable of bonding to oily galvanized steel. In some cases vinyl plastisols are employed, however, these applications are normally limited to situations that do not require high bonding performance. In any case, these materials are applied at room temperature and later cured through exposure to heat. A current weakness of these materials is that in order to apply them, they must be of low enough viscosity to be mechanically pumped with adequate flow rates. Normally, because of their low viscosity these materials are easily displaced when exposed to liquid impingement by various cleaning solutions (washes) to which the assembly body parts are exposed.

Recently a new class of materials referred to as hot applied adhesives have been introduced in the automotive body shop. These are urethane or epoxy-modified urethanes and are solid or semi-solid at room temperature. These adhesives function by changing from a flowable fluid at an elevated application temperature to a bonding solid at use temperature. The hot applied adhesives have a number of characteristics which make them attractive for use in the body shop area. They are usually solvent free and thus no special fume collection hoods are needed. They have low viscosities when made fluid and thus flow readily to fill gaps and wet the substrates to be bonded. Most importantly the resins after application provide a high strength bond and cure to an even higher strength after passage through drying ovens at a later stage on the line. Additionally, the applied adhesive compositions have a rapid set time. They will not be displaced when exposed to liquid impingement by various washes to which the assembled body parts are subjected.

The assembled parts as they move from the body shop area are subjected to sealing, painting, and final oven curing in the paint shop area. Sealant compositions used in this area must also have a certain set of characteristics to be acceptable. Vinyl plastisol compositions have been found to have those needed characteristics. Basically, a vinyl plastisol is a finely divided polyvinyl chloride resin suspended in a plasticizer. The plastisols are liquids which are applied at room temperature to the substrate. The liquid is converted to a solid through exposure to heat In effect, the heat causes the suspended resin particles to be fused or dissolved in the plasticizer. A solid product results upon subsequent cooling.

Vinyl plastisols are excellent as sealants in the paint shop area of the body assembly line. They flow readily at room temperature to fill seams and body joints which need to be sealed. They adhere well to primed metal surfaces. They can be painted over without leaching or causing other cosmetic problems. Finally, they are durable enough to withstand normal weather and user exposure. Another important quality of the vinyl plastisols is that they are not expensive. The plastisols would ideally be used in all adhesive and sealing phases of the automotive assembly process if they had better metal bonding properties and could withstand the washes and primer applications experienced in the body shop area of the process. In this regard, Gerace et al, U.S. Pat. No. 4,900,771, assignee the same as the present, discloses thermally stable hot applied plastisol compositions that are especially useful in the assembly of metal automotive parts. The plastisol composition disclosed therein can be hot applied to automotive parts for adhesive and sealant purposes, and can subsequently withstand the successive steps of a washing, top coat paint application and oven bake.

The method of bonding and/or sealing using the composition disclosed in U.S. Pat. No. 4,900,771 involves hot applying the plastisol composition to joint areas of a metal assembly, followed by cooling the composition sufficiently to achieve sufficient bonding. If an automobile body or a part thereof is being sealed in this manner, the method may in some instances further involve applying a primer composition to the metal assembly, heating the metal assembly to cure the primer, and applying additional plastisol composition to joint areas to form a sealed smooth surface In any event, it will usually involve applying a paint composition to the metal assembly, and baking the metal assembly to cure the plastisol composition and the paint composition.

After a paint composition is applied to the metal assembly, there is an appearance difference between the paint-over-metal surface and the paint-over-sealant surface. This appearance difference will depend on the particular paint and sealant compositions used and may range in degree from very slight to extremely gross including major surface imperfections such as tack, run-off, discoloration, cracking, peeling, cratering, etc. One reason for this appearance difference is that the metal can accept the electrophoretic primer coating and the sealer cannot. This results in a paint difference over painted primed metal versus painted unprimed sealer.

In this regard, heretofore no sealant and/or adhesive has been able to successfully accept an electrophoretic primer coating in order to alleviate differences in appearance between paint-over metal and paint-over sealant surfaces on an automatic body. Moreover, another benefit of having a sealer or adhesive accept the electrophoretic primer better than the sealer is that the coating can form a barrier over the bond line and protect the bond line from weakening due to the exposure of environmental elements such as moisture, salt, oils, etc.

Therefore, in order to remove any possibility of paint appearance difference regardless of the particular paint composition and sealant composition employed, and to also enhance the bonding capabilities under environment exposures, it would be highly desirable to have a sealant which would allow a primer composition to successfully be applied on the sealant by electrophoretic deposition.

In this way, such a sealant would be electrophoretic coatable—i.e. able to accept primer coating and thus, eliminate the appearance difference between the paint-over-metal surface and the paint-over-sealant surface. The paint surface would have a uniform appearance over the entire automobile body surface. However, traditional adhesives and sealants when placed on galvanized steel panels act as electrical insulators thus precluding successful electrophoretic deposition of the primer coating. In this regard, for other reasons some adhesives incorporate conductive fillers in large amounts ranging from at least 35% to as high as 75% by weight. While these adhesives and sealants may have some electrical conductivity with this filler composition, the vital properties and functions of such adhesives and sealants can be destroyed as a result of the inordinate high filler content. As a result, they have not been used as electrophoretic coatable sealant compositions, as far is known.

In an unrelated art, Japanese Patent No. 63-140609 discloses using an epoxy resin adhesive for producing an electric distributor case. The Japanese patent discloses a conductive material incorporated into an epoxy resin. The conductive materials used include aluminum, zinc and graphite flakes. The preferred formulation requires approximately 35% conductive material and about 50% epoxy resin. However, the use of conventional graphite flakes in addition to other conductive material in these amounts would not preserve the properties of a sealant composition which is to be used on an automobile body surface. In that regard, the formulation of Japanese Patent No. 63-140609 is directed toward forming an electric distributor case which is not required to accept electrophoretic deposition of a primer composition. While the Japanese patent may disclose the use of a conductive filler with an epoxy resin adhesive, there still remains a need in the art for a sealant composition which can readily accept a primer composition, and thereafter accept a paint composition to thereby eliminate differences in appearance between the paint-over-metal surface and the paint-over-sealant surface.

Accordingly, there remains a need for a sealant composition which may be applied in the body shop over oily metal, and is electrophoretic coatable, thus allowing a primer composition to be applied uniformally over the entire automobile body surface without thereafter causing any imperfections in appearance after painting and to further protect the sealer bond line from environmental factors. Further, there remains a need for such a sealant composition which does not require large amounts of conductive fillers so as to preserve the properties of the sealant.

SUMMARY OF THE INVENTION

The aforementioned needs are met by the present invention which provides an electrophoretic coatable sealant composition for use in assembling automobile bodies. The electrophoretic coatable sealant composition comprises an adhesive material, preferably in an amount from about 67% to about 99.5% by weight, and a conductive filler, preferably in an amount from about 0.5% to about 33% by weight, to thereby form an electrophoretic coatable sealant composition which will readily accept electrophoretic deposition of a primer composition yet preserve the properties of the sealant composition. The conductive filler is preferably selected from the group consisting of electroconductive non-treated furnace-type carbon blacks, powdered metals and mixtures thereof. The electrophoretic coatable sealant composition may be applied over oily metal and also permits a primer composition to be electrophoretically deposited thereon, thus eliminating the appearance difference between the paint-over-metal surface and the paint-over-sealant surface of a paint-finished automobile.

The conductive fillers have a specific resistance that is in a range from 0.001 to 100 ohm-cm. Furthermore, if carbon black is the chosen conductive filler, the carbon black selected will have the properties of small particle size, high structure, high porosity and low volatility. In that regard, the most preferred carbon black is Ketjenblack EC-300J (Akzo Chemie of America, Co.). The adhesive material is selected from the group consisting of epoxys, urethanes, epoxy-urethane hybrids, acrylics, epoxy-acrylic hybrids and polyvinylchlorides. Optionally, the present electrophoretic coatable sealant may include plasticizers, thermoplastic polymeric resins, an adhesion promotion system and/or an admixture of materials selected from the group consisting of wax, heat stabilizers, non-conductive fillers, pigments, wetting agents, and tackifiers.

Therefore, the present sealant composition is electrophoretic coatable thus allowing a primer composition to be applied uniformally over the entire automobile body surface without thereafter causing any imperfections in appearance after painting. The sealant composition further protects the sealer bond line on the automobile surface from environmental factors. Most importantly, the present sealant composition does not require large amounts of conductive fillers and therefore, preserves &.he properties of the sealant.

The method of using the electrophoretic coatable sealant composition includes the steps of: providing an electrophoretic coatable sealant composition comprising an adhesive material and a conductive material in an amount from about 0.5% to about 33%; applying the sealant composition between the automobile body parts to be joined together; precuring the sealant composition; and electrophoretically depositing a primer composition onto the automobile parts and precured sealant composition.

Accordingly, it is an object of the present invention to provide a sealant composition which is applied in the body shop over oily metal and is electrophoretic coatable, thereby allowing a primer composition to be applied uniformally over the entire automobile body surface without thereafter causing any appearance imperfections. It is also an object of the present invention to provide a sealant composition which does not require large amounts of conductive fillers so as to preserve the properties of the sealant.

DETAILED DESCRIPTION OF THE PREFERRED EMBODIMENTS

Adhesive and sealant compositions that can utilize electroconductive fillers of the present invention are these that can bond to oily galvanized metals and also satisfy only key performance characteristics set forth by the automotive industry. This would include epoxys, urethanes, epoxy-urethane hybrids, acrylics, epoxy-acrylic hybrids and polyvinylchlorides. The most preferred composition of the present invention is a modified polyvinylchloride sealant.

In this regard, the preferred composition of the present invention comprises as major ingredients finely divided polyvinyl chloride resin, plasticizer, thermoplastic polymeric resin, an adhesion promotion system, and a conductive filler. Each of the individual components of the composition will be discussed in detail as well as the mode of use of the sealant composition. All percentages and ratios are by weight unless otherwise stated.

The primary focus of the sealant composition is its ability to be electrophoretic coatable. An electrophoretic coatable sealant composition is defined to be a sealant which allows for successful electrophoretic deposition of a primer composition onto the applied sealant composition. This type of sealant is of major importance in the automotive industry since it is customary to place a polymeric coating on automobile bodies during the assembly process in order to improve the corrosion resistance of such steel automobile bodies. This is typically accomplished by the process of electrophoretic deposition, whereby the automobile steel body is made to act as a cathodic electrode when placed in a colloidal polymeric solution along with accompanying electrical apparatus. The polymeric coating, often referred to as the primer coating, contains particles that are positively charged and thus, will migrate toward the cathode (automobile body) and lose their charge resulting in an agglomeration of polymeric coating particles on the automobile body surface. Thereafter, the automobile body and deposited coating particles will be cured at a high temperature thus producing a smooth, hard paintable surface.

Therefore, in producing a sealant that is capable of being electrophoretic coatable, it is imperative that a conductive filler be included in the sealant composition. The conductive filler preferably has a low specific resistance in a range from about 0.001 to 100 ohm-cm. However, specific resistance alone is not determinative in choosing a conductive filler for the electrophoretic coatable sealant composition of the present invention since it has been found that some materials having low specific resistances do not provide the requisite conductivity. For example, it has been found that when powdered aluminum having a specific resistance of approximately $3 \times 10^{-6}$ is used by itself as a conductive filler in the present sealant composition, electrophoretic coating is not successful. Thus, in addition to specific resistance, other factors significantly affect the electrophoretic coatable aspect of the present sealant composition.

The preferred conductive fillers are carbon blacks since they readily conduct electricity and can be readily incorporated into an organic matrix. In this regard, the important factors influencing the degree of conductivity of carbon blacks include particle size, particle structure, porosity and the volatile content. The most preferable carbon black will have a small particle size so as to provide more particles per unit volume thus reducing the interparticle distances. The most preferred carbon black will also have high structure in order to increase the conductive path through which the electrons travel as they traverse through the carbon. By providing a carbon black with high structure, the number of insulative gaps are reduced and the electrons travel through the carbon black with less resistance which results in a more conductive carbon black. It is also preferable to have a carbon black having a high porosity so as to yield more particles per unit weight when compared to compact solid particles. Thus, the interparticle distances are reduced which also results in a more conductive carbon black. Furthermore, the preferred carbon black will have a low volatile content in order to promote electron tunneling through the carbon black. In effect, uninhibited electron tunneling leads to a more conductive material. It is possible to remove any surface oxygen groups on the carbon black by calcination in an inert atmosphere which further improves the conductive properties of the carbon black.

There are yet other parameters which are of significance when providing the preferred carbon black. One such parameter includes providing sufficient carbon black in the electrophoretic coatable sealant composition to achieve the necessary small interparticle distances for adequate electron tunneling. It is also preferable that intensive mixing of the sealant composition be avoided since the excess dispersion caused thereby tends to destroy the effective structure of the carbon black, thus increasing interparticle distances. As a result, lower conductivity of the electrophoretic coatable sealant composition is experienced.

It should be understood that although conductive fillers are preferred in the present sealant composition, other conductive materials my be substituted therefor to impart the requisite conductive properties for a electrophoretic coatable sealant. For example, conductive polymers such as polyphenylene sulfide, polypyrrole, polythiophene or polyquinoline may be used to provide a electrophoretic coatable sealant composition. However, because of cost and other physical property considerations, conductive fillers such as carbon blacks having the aforementioned characteristics are preferred. As stated previously, high amounts of conductive fillers may provide a sealant composition with sufficient conductivity to allow successful electrophoretic deposition thereon. In that regard, past typical loadings were on the order of 25% to 85% by weight of the total sealant composition. However, the electrophoretic coatable sealant composition of the present invention has been achieved using significantly less conductive filler. The amount of conductive filler is in an amount from about 0.5% to about 18% by weight. The preferred conductive fillers used in the present invention are present in amounts of about 4% by weight. This was found to be new and unexpected. By incorporating conductive fillers at these levels, the other properties of the sealant composition are not inhibited or altered.

Table II illustrates the electrophoretic coatability of the present sealant compositions incorporating various amounts of the conductive fillers shown in Table I:

TABLE II

Ability of Conductive Fillers To Produce Electrophoretic Coatable Sealants
No = No electrocoating on sealer
Yes = Sealer fully electrocated
SL = Sealer slightly electrocated
VSL = Sealer very slightly electrocated

| Conductive Filler Type | % Conductive Filler in Formulation: | | | | | | | | | |
|---|---|---|---|---|---|---|---|---|---|---|
| | 1 | 2 | 3 | 3.85 | 4 | 5.66 | 8 | 10.71 | 16 | 33.33 |
| Black Pearls | No | SL | Yes | Yes | — | — | — | — | — | — |
| EC-600 | No | Yes | Yes | Yes | — | — | — | — | — | — |
| EC-300 | No | No | SL | Yes | — | — | — | — | — | — |
| XC-72 | No | No | — | — | NO | SL | — | — | — | — |
| 105 Aluminum | No | No | — | — | No | — | No | — | No | No |
| 201 Aluminum | No | No | | | No | | No | — | No | No |
| Carboflex | | No | — | — | No | — | No | VSL | — | — |

The preferred carbon black will be selected from the group of all non-treated furnace type carbon blacks that impart electrical conductivity including but not limited to: Vulcan P, (Cabot Corp.), Vulcan XL-72, (Cabot Corp.), Black Pearls 2000, (Cabot Corp.), Conductex 975, (Columbian Chemical Co.), Conductex SC, (Columbian Chemical Co.), Ketjenblack EC-300J, (Akzo Chemie of America), Ketjenblack EC-600JD, (Akzo Chemie of America). Electroconductive black Ketjenblack EC-300J is the most preferred carbon black to be used as the conductive filler in the present electrophoretic coatable sealant composition. This particular carbon black possesses all of the aforementioned preferred carbon black characteristics including small particle size, high structure, high porosity and low volatiles content and easy dispensibility. Additionally, Ketjenblack EC-300J has hollow, shell-like particle shapes which result in larger volume per unit weight. Furthermore, the shape of these particles helps minimize the width of the gaps between "structure chains". Finally, because of the shape of the EC-300J electroconductive black particles, intensive mixing causing excessive dispersion of the particles does not affect the conductivity of the present electrophoretic coatable sealant composition.

Table I illustrates the physical properties of the preferred conductive fillers. Table I includes aluminum only for comparison purposes:

TABLE 1

Physical Properties of Conductive Fillers

| Conductive Filler | Dry Resistivity (OHM-CM) | Particle Size ($\mu$) | (BET) Surface Area ($m^2/g$) | (DBP) Oil Absorption (cc/100g) |
|---|---|---|---|---|
| Black Pearls (2000) | N/A | 0.015 | 1475 | 330 |
| EC-600 | 0.06 | 0.030 | 1250 | 495 |
| EC-300 | 0.06 | 0.030 | 800 | 365 |
| Vulcan XC-72 | 0.2 | 0.030 | 190 | 178 |
| 105 Aluminum | $10^{-6}$ | 5.000 | 75 | N/A |
| 201 Aluminum | $10^{-6}$ | 17.000 | 0.35 | N/A |
| Carboflex | 0.006 | (D)12, (L)200 | <1 | No absorption, only surface coating |

As can be seen in Table II, only the sealant compositions incorporating carbon black conductive fillers in the desired amount exhibited the ability to be electrophoretic coatable. Aluminum, as stated previously, does not yield a electrophoretic coatable sealant composition even though aluminum has a low specific resistance and was used in high proportions. However, various types of aluminum in varying amounts may be used in combination with the aforementioned carbon black conductive fillers. The success of this technique is exemplified in Table III illustrated below.

TABLE III

Ability of 201 Aluminum to Produce Electrophoretic Coatable Sealant in Combination with Ketjenblack EC-300
No = No electrocoating on sealer
Yes = Sealer fully electrocated
SL = Sealer slightly electrocated
VSL = Sealer veryl slightly electrocated

| Conductive Filler Type | Conductive Filler in Formulation | | |
|---|---|---|---|
| | Sample #1 | Sample #2 | Sample #3 |
| EC-300J | 2% | 2% | 2% |
| 201 Aluminum | 4% | 8% | 16% |
| Result | SL | SL | Yes |

Referring now to the other components of the most preferred embodiment, the polyvinyl chloride resins used are finely divided resin particles which are capable of being dispersed in a plasticizer. The resins are well known and have been widely used in plastisol compositions. The polyvinyl chloride resins include polymers of vinyl chloride as well as copolymers of vinyl chloride with copolymerizable vinyl addition monomers. Examples of such vinyl addition monomers include vinyl acetate, the vinyl acetals, maleic esters, styrene, vinylidene chloride and acrylonitrile. The particularly preferred polyvinyl chloride resins are the fine particle dispersion type copolymer resins and vinyl chloride/vinyl acetate copolymers in a monomer weight ratio of vinyl chloride to vinyl acetate of from about 99:1 to about 90:10. Blends of several different polyvinyl chloride resins may also be used and will also be referred to as the polyvinyl chloride resin, even though more than one resin may actually be present. Actually, as mentioned, a blend of 50-100% and most preferably 70-90% of a copolymer dispersion resin and 0-50% and most preferably 10-30% of a vinyl chloride/maleic ester copolymer blending resin is preferred.

Plasticizers useful in the present invention include monomeric types selected to achieve desired characteristics such as proper gelation, fusion, and flow properties. Examples of such monomeric plasticizers include monomeric esters of phthalic, benzoic, succinic, adipic, sebacic, talic, lauric, azelaic, caprylic, hexanoic, phosphoric, oleic, glutaric, trimellitic and stearic acids. Specific plasticizers include dioctyl phthalate, ethylene glycol dibenzoate, dioctyl succinate, dibutyl sebacate; dibenzyl azelate; didecyl glutarate and similar compounds. Other monomeric elasticizers include esters of 2,2,4-trimethyl-1,3-pentanediol, citric acid esters and n-ethyl toluenesulfonamide. Preferred is diisodecyl phthalate.

Polymeric plasticizing agents can be used in conjunction with the monomeric plasticizers in order to achieve special characteristics such as permanence, weathering resistance, and especially paintability. Polymer plasticizers useful in the present invention include the higher molecular weight polymeric acid esters (molecular weights greater than 1000). Examples of these polymeric plasticizers include esters of succinic, adipic, sebacic, talic, lauric, azelaic, caprylic, hexanoic, benzoic, phthalic, phosphoric, oleic, glutaric, trimellitic, and stearic acids, including mixtures or blends of these compounds. The polymeric plasticizers have low diffusion rates because of their higher molecular weights and also act to retard the migration of other components from the applied compositions. Additionally, low molecular weight chlorinated paraffinic oils and epoxidized soybean oil can be used as a co-plasticizers. Again, blends of several different plasticizers may be used, but will be referred to simply as the plasticizer.

Another essential component of the present electrophoretic coatable sealant composition is a thermoplastic polymeric resin which is capable of softening at application temperatures sufficiently to be flowable. Resins of this nature are commonly referred to as hot applied resins. The resins are characterized by their ability to set to a solid material by cooling rather than by solvent evaporation or chemical reaction. Thus, the resins are reduced to a soft or molten state by increasing temperature. Most of these resins progressively soften over a wide temperature range, though some may actually have very narrow melting ranges and become a true liquid. Each type of resin is useful herein and is referred to as a hot applied resin. Typical resins are solid or semi-solid pastes at room temperature with softening temperatures of about 200° F. to about 375° F. Examples of thermoplastic polymeric resins include the polyethylenes, polyamides, polyvinyl butyrals, polyvinyl acetates, cellulose derivatives, polyesters, polymethyl methacrylates and ethacrylates, polyvinyl ethers and polyurethanes. Specific examples of such thermoplastic resins include ethylene ethyl acrylate copolymers, vinyl acetate styrene butadiene block copolymers and butyl rubber.

Preferred thermoplastic resins are those polymers that show solubility and compatibility with polyvinyl chloride polymers such as ethylene vinyl acetate, vinyl acetate ethylene, vinyl acetate, acrylonitrile, acrylonitrile butadiene copolymer, chlorinated ethylene vinyl acetate, polyepsilon caprolactone, methyl metacrylate and polybutylene terephthalate. An ethylene vinyl acetate having a 20–80% vinyl acetate content is preferred. Vinyl acetate ethylene copolymers having a vinyl acetate content of preferably 50–70% and most preferably 60–65% are highly preferred because of their balance of compatibility, flow, adhesion and flexibility.

The adhesion promotion system found in the present sealant composition preferably contains an unsaturated organosilane; an acrylic monomer; and an unsaturated acid or anhydride monomer. Most preferably it also contains an epoxy resin or modified epoxy resin and a hardening agent for the epoxy resin, such as a polyamide or modified polyamide. All of the unsaturated materials are capable of polymerization with peroxide initiation and heat. The formation of a highly functionalized oligomeric or polymeric modified acrylic species in situ (after heating) in concert with the reacted epoxy resin presumably is what is responsible for the tenacious bonding of the current adhesive to oily metals.

Examples of unsaturated organosilanes are the vinyl, acrylics and methacrylic types such as vinyl trichlorosilane, vinyl triethoxy silane, vinyl trimethoxy silane, vinyl-tris β-methoxy-ethoxy silane, 3-methacryloxypropyl trimethoxy silane, 3-methacryloxy propyl-tris-2 (methoxy-ethoxy) silane and vinyl triacetoxy silane. Examples of acrylic monomers are any of the free radical induced polymerizable mono or multifunctional acrylic or methacrylic monomers such as trimethalopropane trimethacrylate, hexane diol diacrylate, and butyl methacrylate. Examples of unsaturated acid or anhydride monomers are the vinyl, acrylic, and methacrylic mono or poly functional acid or anhydride materials maleic, acrylic, crotonic, methacrylic, oleic, linoleic, and tetrahydrophthalic acid or anhydride.

Examples of unmodified epoxy resins are those based on bisphenol-A and epichlorohydrin with typical properties that includes an epoxy value of 152–155 equiv./100g and a weight per epoxide of 182–192. Other typical epoxy resins are phenol novolac, triphenylolmethane, and tetrabromo bis-A. An example of a modified epoxy resin includes the preferred elastomeric modified liquid epoxy resin which is a 40% adduct of carboxylated acrylonitrile butadiene elastomer and a liquid bisphenol-A and epichlorohydrin type epoxy. That adduct has a weight per epoxide of 325–375. Curing for the epoxy or modified epoxy resin is accomplished by reacting the resin with an appropriate curing or hardening agent. Typical hardening agents are polyamides, amines and anhydrides. Examples include diethylenetriamine, methane diamine, m-phenylene diamine, diaminodiphenyl sulfone, tris (dimethyl amino methyl) phenol, dicyandiamide, BF3-monoethyl amine and nadicmethyl anhydride. Preferred is a modified polyamide hardening agent such as a latent polyamide dispersion which is an adduct of phthalic anhydride and diethylenetriamine in an unmodified liquid epoxy resin. The epoxy or modified epoxy resin/hardening agent system apparently modifies the galvanized surface by reacting with and/or to the adhesion promotion system in the preferred embodiment.

It has been found that inclusion of the adhesion promotion system in the present sealant composition at the stated level significantly increases the adhesion of the composition to a metal surface without adversely affecting the qualities of the applied composition. That is, the composition's resistance to primer wash, paintability, viscosity stability etc. are not adversely affected by the adhesion promoter. Other adhesion promoters are also preferably used with the current materials and, again, reference to the adhesion promoter is reference to the adhesion promoter system unless otherwise indicated.

The sealant composition of the present invention is formulated with the above essential components to achieve a product having the desired set of characteristics considering their intended use. As stated previously, the electrophoretic coatable sealant composition is intended as an adhesive and sealant for use in the assembly of metal automotive parts. As such the sealant composition is able to flow at application temperature with the proper wet-out onto a surface, i.e., they are "pumpable". Upon cooling an initial degree of adhesion is attained as discussed below. Additionally, because of the intended use, the set composition is capable of receiving a primer wash without experiencing wash-out. Finally and most important for the present invention, the sealant composition is electrophoretic coatable as described above and thus, readily accepts the deposited primer composition. The composition also has a final degree of adhesion which is very durable.

Optional components of the present sealant composition comprise waxes, heat stabilizers, other fillers, pigments, wetting agents, and tackifiers. Such components are readily available for use in sealants. Amorphous waxes, carnauba wax, castor oil wax and various synthetic waxes are also useful. Examples of heat stabilizers include lead and barium-cadmium-zinc systems. Fillers other than those discussed above include ground and precipitated calcium carbonate, precipitated silica, clays and talcs. Examples of wetting agents are polyethylene glycol derivatives.

Electrophoretic coatable sealant compositions of the present invention with the immediately aforedescribed qualities preferably comprise (a) a finely divided polyvinyl chloride resin in an amount from about 20% to 35% by weight, (b) a plasticizer in an amount from about 15% to 45% by weight, (c) a thermoplastic polymeric resin in an amount from about 2% to 25% by weight, (d) an adhesion promotion system in an amount from about 3% to 15% by weight, (e) a conductive filler in an amount from about 0.5% to 10% by weight and (f) a non-conductive filler in an amount from about 0% to 20% by weight. A more preferred sealant composition consists essentially of (a) a polyvinyl chloride resin from about 22% to 32% by weight, (b) a plasticizer from about 25% to 45% by weight, (c) a thermoplastic polymeric resin from about 5% to 20% by weight, (d) an adhesion promoter from about 4% to 12% by weight, (e) a conductive filler from about 2% to 8% by weight, and (f) the balance selected from the group consisting of a wax, heat stabilizer, non-conductive fillers, pigment, wetting agent, tackifiers and mixtures thereof.

The most preferred electrophoretic coatable sealant composition in terms of performance and cost considerations consists essentially of (a) a polyvinyl chloride resin from about 25% to 30% by weight, (b) a plasticizer from about 30% to 40% by weight, (c) a thermoplastic polymeric resin from about 5% to 15% by weight, (d) an adhesion promoter from about 5% to 11% by weight, (e) a conductive filler from about 2% to 5% by weight, (f) a non-conductive filler from about 5% to 15% by weight.

The aforedescribed sealant composition of the present invention are unique in their ability to act as a structural adhesive and a sealant in the assembly of automotive bodies. Thus, the sealant compositions are used in the body area of the assembly to bond various steel components such as hoods and roof panels. Additionally, the compositions are used in the body shop area where certain components, which demand greater structural bonds than are obtained by welding, require a sealant to smooth over the weld. The sealant compositions are heated from about 90° F. to about 160° F. and applied in any convenient manner, such as pumping, troweling, flowing, brushing or spraying. The compositions are thermally stable so that they can be heated and drawn from by a pumping operation for prolonged periods. Upon cooling the compositions harden to a state with an initial degree of adhesion which is adequate for the intended purpose. This solidification occurs despite the plastisol nature of the compositions.

The assembled automotive body components or body shell is next prepared for painting. Typically this involves phosphate cleaning and washing, neither of which impede or alter the properties of the present sealant composition. Next, the body shell is immersed in a primer composition bath and an electric charge is applied to effect electrophoretic deposition of the primer coating onto the body shell including the sealed surfaces, and thereafter removing the primed body shell from the bath. The sealant compositions originally applied as adhesives and sealants remain in tack and readily accept the primer composition.

Subsequent to the priming step, if one is used, and prior to an oven bake, the body shell is top coated with a paint and oven baked to a totally cured state by plastisol fusion of the sealant and also the top coat paint. The fusion temperature is well above the aforementioned application temperature. The applied compositions of the invention are also able to withstand these operations without causing cosmetic-type problems such as discoloration, tackiness, cracking, etc. Accordingly, there are no appearance differences between the paint-over-metal and paint-over-sealant surfaces.

It should be apparent the sealant compositions of the present invention enjoy all the qualities of previously used hot applied adhesive and sealant compositions and vinyl plastisol compositions, collectively. The synergistic nature of the electrophoretic coatable sealant composition components without having an adverse properties is very unexpected. An added benefit flowing from the present sealant composition having such qualities is reduced inventory in not having to stock two separate products as well as a consequent reduced administrative burden.

In order to make the invention more readily understood, reference is made to the following examples, which are intended to be illustrative of the invention, but are not intended to be limiting in scope.

EXAMPLE I

|  | % |
| --- | --- |
| Polyvinyl chloride dispersion resin (1) | 19.00 |
| Polyvinyl chloride blending resin (2) | 8.00 |
| Diisodecyl phthalate plasticizer | 28.00 |
| Epoxidized soybean oil plasticizer (3) | 2.00 |
| Vinyl acetate ethylene copolymer thermoplastic resin (4) | 13.00 |
| 3-methacryloxypropyl trimethoxy silane adhesion promoter (5) | 0.30 |
| Elastomeric modified liquid epoxy resin (6) | 2.00 |
| Calcium organic thixotropic agent (7) | 0.50 |
| Methacrylate ester adhesion promoter (8) | 4.50 |
| Calcium carbonate filler (9) | 8.04 |
| Hydrophobic fumed silica filler (10) | 4.15 |
| Calcium oxide filler | 2.00 |
| Anionic surfactant wetting agent (11) | 0.16 |
| Modified polyamide hardening agent (12) | 3.0 |
| Cumene hydroperoxide | 0.08 |
| Tri-basic lead sulfate heat stabilizer (13) | 1.00 |
| Hydroquinone monomethyl ether | 0.02 |
| Tetrahydrophthalic anhydride adhesion promoter | 0.30 |
| Carbon black pigment | 0.05 |

-continued

| | % |
|---|---|
| Titanium dioxide pigment | 0.05 |
| Carbon black (14) | 3.85 |
| | 100.00% |

(1) A homopolymer available from Huls Corp. as Vestolit E 7031
(2) A copolymer of vinyl chloride and dibutyl maleate available from The Goodyear Tire and Rubber Co. as Pliovic MC-85
(3) Available from the C.P. Hall Co. as PlastHall ESO
(4) A hot applied resin available from USI Chemicals Co. as Vynathene EY80031
(5) Available from Dow Corning as Z-6030 Silane
(6) Available from Wilmington Chemical Corp. as Heloxy 8005
(7) Available from Ashland Chemical Corp. as Ircogel 903
(8) Available from Sartomer Co. as Chemlink 9010
(9) Available from H.M. Royal Inc. as Roy Cal L
(10) Available from Cabot Corp. as Cab-O-Sil TS-720
(11) Available from BYK Chemie USA as BYK-W 960
(12) Available from Ciba-Geigy Corp. as Hardener HY 940
(13) Available from Eagle Picher Co. as EPIstatic
(14) Available from Akzo Chemie of Ameria as Ketjenblack EC-300J

EXAMPLE II

Another preferred electrophoretic coatable sealant incorporates an epoxy adhesive material and has the following formulation.

| Ingredient | Parts by weight |
|---|---|
| Araldite GY-6010 Epoxy Resin (1) | 100 |
| CaCO3 Filler (2) | 30 |
| Fumed Silica Thixotrope (3) | 3 |
| Dicyandiamide (4) | 6 |
| 3-phenyl-1,1-dimethyl urea (5) | 2 |
| Ketjenblack EC-300 (6) | 6 |

(1) Ciba-Geigy
(2) H.M. Royal
(3) Cabot Corp.
(4) Omnicron Chemical Inc.
(5) RSA Corp.
(6) Akzo Chemie of America

EXAMPLE III

In yet another preferred embodiment of the present invention, a polyurethane material is incorporated to form an electrophoretic coatable sealant:

| Ingredient | Parts by weight |
|---|---|
| Isocyanate Prepolymer* (1) | 30 |
| Santicizer 278 (2) | 23 |
| Organic silane A-187 (3) | 1 |
| Toluene (4) | 2 |
| Linde 5A desular sieves (5) | 1 |
| Precipitated silicon (6) | 6.0 |
| Calcium Carbonate (7) | 31.0 |
| Titanium Dioxide (8) | 2.0 |
| Ketjenblack EC-300 (9) | 4.0 |

*Prepolymer prepared with 85 parts of NIAX PPG 2025; 24 parts NIAX polyol 11-34 and 16.5 parts of toluene diisocyanate (TDI).
(1) Union Carbide Co.
(2) Monsanto Co.
(3) Union Carbide Co.
(4) Ashland Oil Co.
(5) Union Carbide Co.
(6) PPG Corp.
(7) H.M. Royal Co.
(8) Dupont Co.
(9) Akzo Chemie of America Having described the invention in detail and by reference to the preferred embodiments thereof, it will be apparent that other modifications and variations are possible without departing from the scope of the invention defined in the appended claims.

What is claimed is:

1. A method of using an electrophoretic coatable sealant composition in assembling automobile bodies to form a load-bearing joint between automobile parts comprising the steps of:
   a) providing an electrophoretic coatable sealant composition comprising an adhesive material in an amount from about 67% to 99.5 by weight and a conductive filler in an amount from about 0.5% to about 33% said conductive filler including from about 2 to 8% by weight of the total composition of an electroconductive non-treated furnace carbon black having a small particle size, high structure, high porosity, low volatiles content, a hollow, shell-like particle shape and a specific resistance in a range from 0.001 to 100 ohm-cm;
   b) applying said sealant composition between the automobile body parts to be joined together;
   c) precuring said sealant composition; and
   d) electrophoretically depositing a primer composition onto said Automobile body parts and said precured sealant composition.

2. The method of claim 1 wherein said precuring occurs by use of radiant energy.

3. The method of claim 1 wherein said precuring occurs by use of induction curing.

4. The method of claim 1 wherein said precuring occurs by use of oven curing.

5. The method of claim 1 wherein said sealant composition comprises:
   a) a polyvinyl chloride resin from about 22% to 32% by weight;
   b) a plasticizer from about 25% to 45% by weight;
   c) a thermoplastic polymeric resin from about 5% to 20% by weight;
   d) an adhesion promotor from about 4% to 12% by weight;
   e) a conductive filler from about 2% to 8% by weight said conductive filler being an electroconductive non-treated furnace carbon block having a small particle size, high structure, high porosity, low volatile content, a hollow shell-like particle shape and a specific resistance in a range from 0.001 to 100 ohm-cm; and
   f) an admixture of materials selected from the group consisting of wax, heat stabilizers, non-conductive fillers, pigments, wetting agents, and tackifiers in an amount from about 0.5% to 25% by weight.

6. The method of claim 5 wherein the polyvinyl chloride resin is selected from the group consisting of homopolymers of vinyl chloride, copolymers of vinyl chloride with vinylidene chloride, vinyl acetate, maleic ester or styrene, and mixtures thereof and said plasticizer is selected from the group consisting of monomeric esters of phthalic, benzoic, succinic, adipic, sebacic, talic, lauric, azelaic, caprylic, hexanoic, phosphoric, oleic, glutaric, trimellitic, and stearic acids, N,N-2,2,4-trimethyl-1,3-pentanediol benzoate isobutyrate, polymeric esters of succinic, adipic, sebacic, talic, lauric, azelaic, caprylic, hexanoic, benzoic, phthalic, phosphoric, oleic, glutaric, trimellitic, and stearic acids, and mixtures thereof.

7. The method of claim 6 wherein said thermoplastic polymeric resin is selected from the group consisting of polyethylene, polyamides, polyvinyl butyrals, polyvinyl acetate, cellulose derivatives, polyesters, polyethyl methacrylates and ethacrylates, polyvinyl ethers, polyurethanes, ethylene vinyl acetate, vinyl acetate ethylene, vinyl acetate, acrylonitrile, acrylonitrile butadiene copolymer, chlorinated ethylene vinyl acetate, poly epsilon caprolactone, methyl methacrylate, polybutylene terephthalate and mixtures thereof.

8. The method of claim 7 wherein said adhesion promotion system contains an unsaturated organosilane, an acrylic monomer and an unsaturated acid or anhydride monomer.

9. The method of 8 wherein said adhesion promotion system further includes an epoxy or modified epoxy resin and a hardening agent for said epoxy or modified epoxy resin.

10. The method of claim 9 wherein said hardening agent is selected from the group consisting of polyamides, amines, anhydrides, diethylenetriamine, methane diamine, m-phenylene diamine, diaminodiphenyl sulfone, tris (dimethyl amino methyl) phenol, disyandiamide, BF3-monoethyl amine and nadicmethyl anhydride.

11. The method of claim 10 wherein said unsaturated organosilane is selected from the group consisting of vinyl trichlorosilane, vinyl triethoxy silane, vinyl trimethoxy silane, vinyl-tris-$\beta$-methoxy-ethoxy silane, 3-methacryloxypropyl trimethoxy silane, 3-methacryloxy propyl-tris-2 (methoxy-ethoxy) silane and vinyl triacetoxy silane.

12. The method of claim 11 wherein said unsaturated organosilane is 3-methacryloxypropyl trimethoxy silane, said acrylic monomer is trimethatopropane trimethacrylate and said unsaturated anhydride monomer is tetrahydrophthalic anhydride.

13. The method of claim 1 wherein said electrophoretic coatable sealant composition further comprises powdered aluminum in an amount from about 0.5 to about 12%.

14. The method of claim 1 wherein said adhesive material is selected from the group consisting of epoxys, urethanes, epoxy-urethane hybrids, acrylics, epoxy-acrylic hybrids, polyvinylchlorides and mixtures thereof.

* * * * *